US009713304B2

(12) United States Patent
Atsumi

(10) Patent No.: US 9,713,304 B2
(45) Date of Patent: *Jul. 25, 2017

(54) SELF-PROPELLED MOWER

(71) Applicant: ATSUMI REAL ESTATE & CORPORATION, INC., Tokyo (JP)

(72) Inventor: Kazuya Atsumi, Tokyo (JP)

(73) Assignee: ATSUMI REAL ESTATE & CORPORATION, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,885

(22) Filed: Sep. 22, 2016

(65) Prior Publication Data

US 2017/0020069 A1  Jan. 26, 2017

Related U.S. Application Data

(63) Continuation of application No. 14/869,329, filed on Sep. 29, 2015, now Pat. No. 9,516,810, which is a
(Continued)

(30) Foreign Application Priority Data

Apr. 24, 2013 (JP) .................. 2013-091182

(51) Int. Cl.
*A01D 34/86* (2006.01)
*A01D 34/00* (2006.01)
(Continued)

(52) U.S. Cl.
CPC ........... *A01D 34/86* (2013.01); *A01D 34/006* (2013.01); *A01D 34/66* (2013.01); *A01D 34/008* (2013.01); *A01D 69/02* (2013.01); *A01D 2101/00* (2013.01)

(58) Field of Classification Search
CPC .. A01D 34/866; A01D 34/475; A01D 34/661; A01D 34/86; A01D 34/008;
(Continued)

(56) References Cited

U.S. PATENT DOCUMENTS 2,483,762 A * 10/1949 Ebenhoe ............ A01D 34/475
 254/299
3,651,623 A * 3/1972 Harley ................ A01D 34/866
 414/470
(Continued)

FOREIGN PATENT DOCUMENTS

CN  101305661 A  11/2008
DE  26 42 586 A1  4/1977
(Continued)

OTHER PUBLICATIONS

International Search Report issued for corresponding International Patent Application No. PCT/JP2014/061103, mailed Jul. 15, 2014.
(Continued)

*Primary Examiner* — Robert Pezzuto
(74) *Attorney, Agent, or Firm* — Myers Wolin, LLC

(57) ABSTRACT

A self-propelled mower includes a mover main body; a battery, an electric generator, or an engine; a protruding wing that protrudes sideward, the protruding wing being retractable and an extension length of the protruding wing being variable; mowing units protruding from a front face of the mover main body and a front face of the protruding wing, each including a movable blade that reciprocates or rotates to cut grasses driven by an electric motor or the engine, the electric motor being powered by battery or the electric generator. The mover main body moves on a slope face while being towed, via a traction rope, by a straddle-type mover body that moves straddling on a guard rail installed on top of a slope of a bank; or moves on the ground or in the
(Continued)

air while being suspended by a suspension rope hung from a spanning cable spanning in the air.

7 Claims, 4 Drawing Sheets

Related U.S. Application Data continuation of application No. PCT/JP2014/061103, filed on Apr. 20, 2014.

(51) Int. Cl.
*A01D 34/66* (2006.01)
*A01D 69/02* (2006.01)
*A01D 101/00* (2006.01)

(58) Field of Classification Search
CPC ...... A01D 69/08; A01D 75/28; A01D 34/006;
A01D 34/66; Y10S 52/02
USPC ....... 56/6, 10.5, 10.7, 11.2, 11.9, 14.1, 15.1,
56/16.2, 255, 295, 10.2 A–10.2 E, 10.2 R;
254/299; 414/470, 538
See application file for complete search history.

(56) References Cited

U.S. PATENT DOCUMENTS

| | | | |
|---|---|---|---|
| 3,972,159 A * | 8/1976 | Oosterling | A01D 34/661 56/16.2 |
| 5,113,641 A | 5/1992 | Cook et al. | |
| 2012/0227369 A1 | 9/2012 | Koike et al. | |

FOREIGN PATENT DOCUMENTS

| | | |
|---|---|---|
| FR | 2 461 438 A1 | 2/1981 |
| GB | 1 491 468 A | 11/1977 |
| JP | 52-26330 A | 2/1977 |
| JP | 2-17030 U | 2/1990 |
| JP | 4-88912 A | 3/1992 |
| JP | 7-87824 A | 4/1995 |
| JP | 8-256560 A | 10/1996 |
| JP | 9-74849 A | 3/1997 |
| JP | 11-113347 A | 4/1999 |
| JP | 2000-116221 A | 4/2000 |
| JP | 2001-197816 A | 7/2001 |
| JP | 2002-119115 A | 4/2002 |
| JP | 2007-89516 A | 4/2007 |
| JP | 2012-187025 A | 10/2012 |
| JP | 5336672 B1 | 11/2013 |

OTHER PUBLICATIONS

Written Opinion of the International Searching Authority for corresponding International Patent Application No. PCT/JP2014/061103 mailed on Jul. 15, 2014, with English translation and sworn statement/declaration.

Non-Final Office Action issued by the USPTO on Jun. 22, 2016 for corresponding U.S. Appl. No. 14/869,329.

The partial European search report issued by the European Patent Office for corresponding European Patent Application No. 14788230.2, mailed on Feb. 29, 2016.

First Notification of Office Action issued by the State Intellectual Property Office of China for corresponding Chinese Patent Application No. 201480023148.5, dated May 12, 2016, with an English translation.

* cited by examiner

SELF-PROPELLED MOWER

CROSS-REFERENCE TO RELATED APPLICATIONS

This application is a continuation of U.S. application Ser. No. 14/869,329 which was filed on Sep. 29, 2015, now pending, which is a continuation application of International PCT Application No. PCT/JP2014/061103 which was filed on Apr. 20, 2014, which claims priority to Japanese Patent Application No. 2013-091182 which was filed on Apr. 24, 2013, the entire contents of each are herein incorporated by reference.

TECHNICAL FIELD

The present invention relates to a self-propelled mower for weeds growing on flat grounds, more particularly to a mower that can also be used on a slope face.

BACKGROUND ART

Mowers for weeds growing on flat grounds or slope faces are disclosed in Japanese Laid-open Patent Application Nos. H7-87824, H8-256560, and H9-74849, for example.

The "mower for the slope face" disclosed in Japanese Laid-open Patent Application No. H7-87824 has its object to "provide a mower having a novel structure for slope faces, capable of efficiently and safely carrying out mowing operation on the slope face which has to be done regularly every year from a viewpoint of safety control of river and maintenance of fine view", and to attain this object, "a fitting trestle also useful as a working stand is attached to the side of a bed of a moving vehicle equipped with a suspending device of a telescopic arm type and a connecting frame is coupled with the end of the slope face side of the fitting trestle by a pivot part of the connecting frame. On the other hand, rotary mowing blocks in number corresponding to the width of the slope face are connected in series to a coupling shaft end of a hydraulic motor integrated with the connecting frame and tires are attached to the outermost side of the blocks to forma rotary. mowing main body . The rotary mowing main body is made into a suspended state by the suspending device of a telescopic arm type and lag of the tire fixed side of the block in low speed traveling of the moving vehicle is controlled to provide a mower for the slope face". Further, the "mower" disclosed in Japanese Laid-open Patent Application No. H8-256560 has its object to "enable a mower to improve a mowing work efficiency and store a surface slope mowing apparatus in a suitable state in unused time by making an effective mowing breadth of the surface slope mowing apparatus to be readily and quickly adjustable according to a length or a state of a slope linking to a side edge of a running road face", and to attain this object, "in a mower having a surface slope mowing apparatus mowing grasses on a slope linking to a side edge of a running road face at the side of the running machine body, the surface slope mowing apparatus is constructed to a reciprocation-type performing a nip-cutting by a relative lateral reciprocate sliding of mutual a pair of upper and lower blades and supported in freely controllable of angles to a longitudinal direction, in freely controllable of a position to a mowing width direction, and in freely swung to a longitudinal direction, then the surface slope mowing apparatus controlled by pulling up upward of the machine body is shaken backward to be able to store in a rear part side of the machine body in a fallen state". Furthermore, the "mower machine for a slope" disclosed in Japanese Laid-open Patent Application No. H9-74849 has its object to "provide a mower machine for a slope safely and surely performable of a mowing work on a steep slant surface such as a bank with a simple operation without requiring expertness in spite of not requiring much labor", and to attain this object, "this mower machine has an unmanned mower having a mowing device in front of a self-running machine body, controlling advancing, backing and an action of the mowing device by a remote operation and performing a mowing work in its advancing and a control truck having a remote operating device controlling advancing, backing of the unmanned mower and the action of the mowing device and a shed part of the unmanned mower. An electric winch device paying out a pulling wire connected to a rear part of the unmanned mower in advancing of the unmanned mower at a speed slower than its advancing speed and winding in backing of the unmanned mower at a speed higher than its backing speed, is provided in the shed part of the control truck".

However, since the "mower for the slope face" disclosed in Japanese Laid-open Patent Application No. H7-87824 requires a moving vehicle equipped with a suspending device of a telescopic arm type, the size of the machine is prone to be relatively increased. In the "mower" disclosed in Japanese Laid-open Patent Application No. H8-256560, regardless of the cover body that is extendable in accordance with adjustment of a position to a mowing width direction of surface slope mowing apparatus, if the cross-section of the slope face is curved, a part of weeds remain uncut since the pair of upper and lower blades are not flexible. In the "mower machine for a slope" disclosed in Japanese Laid-open Patent Application No. H9-74849, the control truck installed on the top of slope may fall off on the slope face.

Hence, the present invention has its object to provide a self-propelled mower that has a relatively simplified structure, allows adjustment of the mowing width, can be used on curved slope faces, enables pruning high place works, and is resistant to falling down.

SUMMARY

To achieve the above-identified object, a self-propelled mower in accordance with a first aspect of the present invention includes: a self-propellable mover main body; at least one of a battery, an electric generator, and an engine, provided in the self-propellable mover main body; a protruding wing that protrudes sideward from sides of the mover main body, the protruding wing being retractable and an extension length of the protruding wing being variable; a plurality of mowing units provided protruding from a front face of the mover main body and a front face of the protruding wing, each including a movable blade that reciprocates or rotates to cut grasses driven by an electric motor or the engine, provided in the self-propellable mover main body, the electric motor being powered by the battery or the electric generator; a suspension rope hung from a spanning cable spanning in the air, the suspension rope suspending the mover main body such that mover main body moves on the ground or in the air while being suspended; and a pulley that is pivoted to an upper end of the suspension rope so as to be freely rotated such that the pulley moves through the spanning cable in accordance with a movement of the mover main body.

Additionally, a self-propelled mower in accordance with a second aspect of the present invention includes a self-propellable mover main body; at least one of a battery, an electric generator, and an engine, provided in the self-propellable mover main body; a protruding wing that protrudes sideward from sides of the mover main body, the protruding wing being retractable and an extension length of the protruding wing being variable; a plurality of mowing units provided protruding from a front face of the mover main body and a front face of the protruding wing, each including a movable blade that reciprocates or rotates to cut grasses driven by an electric motor or the engine, provided in the self-propellable mover main body, the electric motor being powered by the battery or the electric generator; a straddle-type mover body that straddles on a guard rail installed on a top of a slope of a bank, the mover main body moving on a slope face while being towed by the mover main body via a traction rope, a moving speed of the straddle-type mover body being selected to be faster than a moving speed of the mover main body; and an angle sensor that detect an angle of the traction rope, and is provided to the traction rope on a side of the straddle-type mover body; and a controller that stops the movement of the straddle-type mover body if the angle detected by the angle sensor exceeds an acceptable angle.

As used therein, the terms "up" and "down" (or vertical) refers to the direction when the mover main body is installed horizontally.

The first aspect of the present invention has the following advantageous effects provided by the above-identified configurations:

(1) The mover main body that is provided with at least one of the battery, the electric generator, and the engine, and the mowing unit, are provided as separated components, and the protruding wing is configured to be retractable and its extension length is variable. Thus, the self-propelled mower has a relatively simplified structure, allows adjustment of the mowing width, and can be carried easily.

(2) Since the mover main body is suspended from the spanning cable, not only falling down of the mover main body is prevented but also high place works, e.g., pruning of standing trees, are made possible.

The second aspect of the present invention has the following advantageous effects provided by the above-identified configurations:

(1) The mover main body that is provided with at least one of the battery, the electric generator, and the engine, and the mowing unit, are provided as separated components, and the protruding wing is configured to be retractable and its extension length is variable. Thus, the self-propelled mower has a relatively simplified structure, allows adjustment of the mowing width, and can be carried easily.

(2) The mover main body towed by the straddle-type mover body moves on the slope face, and grasses on the slope face are cut. Further, by adjusting the extension length of the protruding wing, not only the mowing width can be adjusted, but the mowing unit, with cutting grasses relative to the ground, while a predetermined spacing is maintained constantly, enabling usage on a curved slope faces. Furthermore, since a moving speed of the straddle-type mover body is selected to be faster than a moving speed of the main move, the straddle-type mover body is prone to move ahead, and it is suffice to stop only the movement of the straddle-type mover body by the angle sensor.

DETAILED DESCRIPTION OF THE INVENTION

Figure 1:
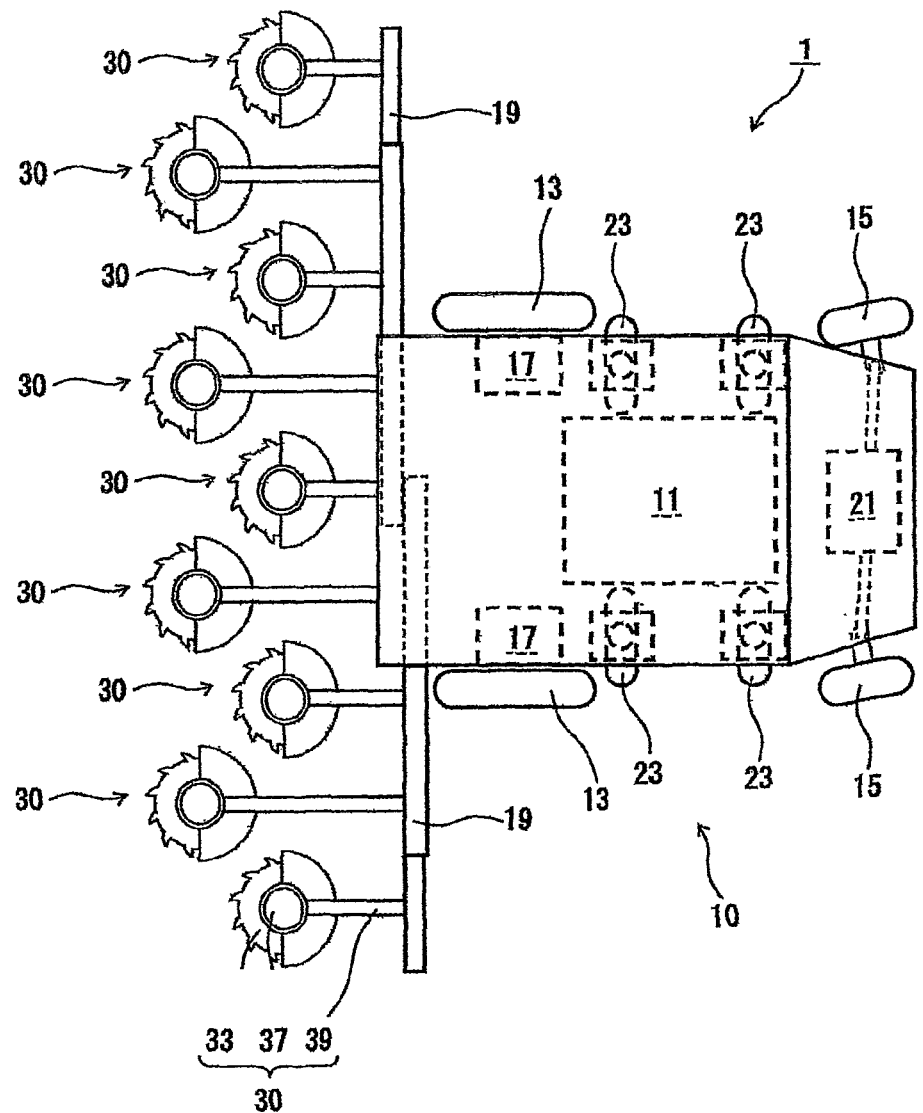
FIG. 1 is a plan view of a self-propelled mower in accordance with a first embodiment.
Figure 2:
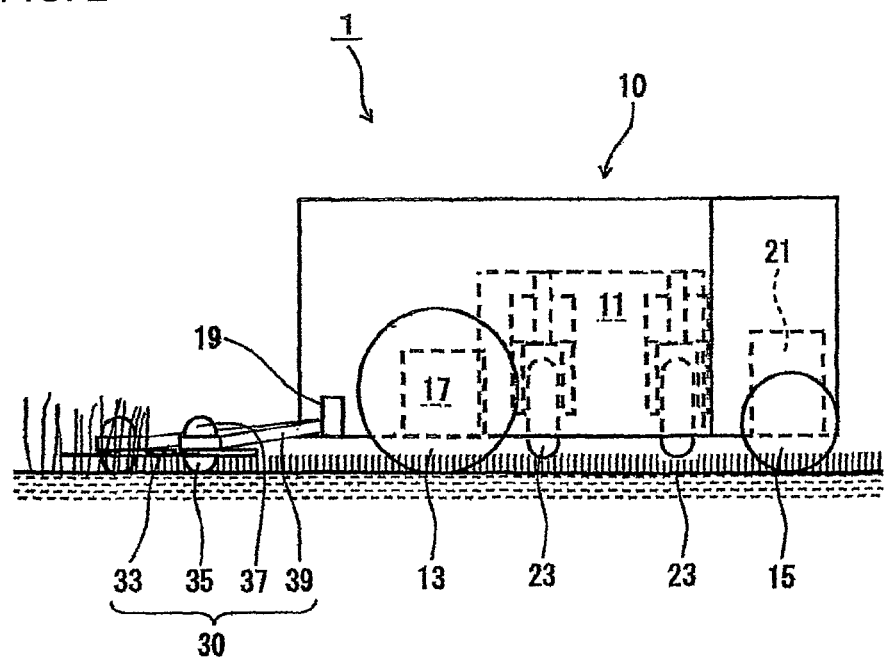
FIG. 2 is a side view of the self-propelled mower in accordance with the first embodiment.

Embodiments of modes for carrying out the present invention will be described with reference to FIGS. 1-5. In FIGS. 1-5, the reference symbol 1 denotes a self-propelled mower in accordance with a first embodiment, the reference symbol 4 denotes a straddle-type mover body used in a self-propelled mower in accordance with a second embodiment, the reference symbol 10 denotes a mover main body, the reference symbol 11 denotes a battery, the reference symbol 13 denotes main driving wheels, the reference symbol 15 denotes driven wheels, the reference symbol 17 denotes a wheel electric motor, the reference symbol 19 denotes expandable wings, the reference symbol 21 denotes a moving controller, the reference symbol 23 denotes a traverse wheel, the reference symbol 30 denotes a mowing unit, the reference symbol 33 denotes a movable blade, the reference symbol 35 denotes a contact ball, the reference symbol 37 denotes a mowing electric motor, the reference symbol 38 denotes a cover of the movable blade, the reference symbol 39 denotes a connecting rod, the reference symbol 51 denotes mover main driving wheels, the reference symbol 53 denotes mover passive wheels, the reference symbol 55 denotes a wheel pressing device, the reference symbol 57 denotes a mover electric motor, the reference symbol 59 denotes horizontal rollers, the reference symbol 61 denotes a suspension rope, the reference symbol 63 denotes a suspension rope winch, the reference symbol 65 denotes a frame, the reference symbol 71 denotes a spanning cable, the reference symbol 73 denotes suspension ropes, the reference symbol 75 denotes pulleys, the reference symbol 77 denotes suspension rope winches, the reference symbol 90 denotes a guard rail, the reference symbol 91 denotes a beam, and the reference symbol 93 denotes a post.

First Embodiment

First, the self-propelled mower 1 in accordance with the first embodiment will be described with reference to FIGS. 1 to 4.

The self-propelled mower 1 generally includes a mover main body 10, and a plurality of mowing units 30 protruding from the mover main body 10, which are configured to be freely attached to and detached from mover main body 10.

The mover main body 10 has a box shape, and includes a battery 11 that is housed at the center thereof, a pair of main driving wheels 13 rotatably pivoted at the right and left in the front, and a pair of driven wheels 15 rotatably pivoted in the rear. A wheel electric motor 17 is coupled to each of the pair of main driving wheels 13, and the wheel electric motor 17 is energized by electric power supplied from the battery 11 to rotate the main driving wheels 13. The driven wheels 15 include a steering mechanism for shifting the moving direction of the mover main body 10, where the moving direction is shifted in response to a command from a moving controller 21. Note that the moving controller 21 is also capable of turning on and off supply of electric power to the wheel electric motor 17, a mowing electric motor 37, and a mover electric motor 57 in the straddle-type mover body 4, as will be described later, and commands for switching on or off the supply may be transmitted wirelessly. Note that in place of the battery 11, the mover main body 10 may contain an electric generator, or a solar panel may be provided on the mover main body 10 as an electric power supply to the battery 11. Alternatively, in place of an electric motor, an engine may be used as a power source.

Furthermore, a pair of traverse wheels 23 are attached to the mover main body 10, on the left and right sides between the main driving wheels 13 and the driven wheels 15, such that the traverse wheels 23 are oriented perpendicular to the orientation of the main driving wheels 13, and are configured to be freely descended or ascended in the vertical direction. The pair of traverse wheels 23 are usually retracted off the ground. When necessary, the traverse wheels 23 are descended until the main driving wheels 13 and the driven wheels 15 are lifted off the ground such that the mover main body 10 can be maneuvered transversely in the direction perpendicular to the moving direction of the mover main body 10. Alternatively, the traverse wheels 23 may be configured detachable, and the traverse wheels 23 are replaced with a base plate and the base plate then may be descended to lift up and secure the mover main body 10 at the place. In such a configuration, the mover main body 10 may be secured to do a high place work safely.

A pair of expandable wings 19 are telescopically retracted in the front of the mover main body 10 such that the expandable wings 19 extend to the left and right from the respective side of the mover main body 10. The extension lengths of the expandable wings 19 can be adjusted, and the extension of the expandable wings 19 are driven by an electric motor (unillustrated) which is powered by the battery 11. Mover main body couplers (unillustrated) are provided to the bottom of the front face of the mover main body 10 and the bottoms of the expandable wings 19, at a predetermined distance defined between the adjacent couplers, for attaching connecting rods 39 that couple mowing units 30 to the mover main body 10, as will be described later. Note that the predetermined distance is selected such that respective grass trimming ranges of the mowing units 30 overlap when viewed from the moving direction of the mover main body 10 to which the mowing units 30 are attached.

Each mowing unit 30 generally includes a movable blade 33, a mowing electric motor 37 located above the movable blade 33, a semispherical contact ball 35 that protrudes toward the ground from the center of the movable blade 33, and a connecting rod 39 that couples the mowing unit 30 to the mover main body 10. The movable blade 33 includes saw teeth around the circumference of a thin disk, and the mowing electric motor 37 rotate the movable blade 33 with the electric power supplied from the battery 11 and the rotated movable blade 33 cuts grasses grown on the ground. The contact ball 35 is secured independently from and thus is not in unison with the rotational axis of the movable blade 33 such that the spacing between the ground and the movable blade 33 can be adjusted for adjusting the length of the grasses remained after cut.

The connecting rod 39 is configured such that the length thereof can be adjusted, and is pivoted to the mowing unit 30 such that the connecting rod 39 can swivel only vertically. The other end of the connecting rod 39 is pivoted so as to be freely rotated to a mover main body coupler (unillustrated) such that the connecting rod 39 can swivel only vertically. An electric power cord (unillustrated) is provided to the connecting rod 39 such that the connecting rod 39 rotatably pivoted to the mover main body coupler only vertically, thereby enabling the battery 11 housed in the mover main body 10 to be electrically connected to the mowing electric motor 37.

For attaching the plurality of mowing units 30 to the mover main body 10, the lengths of the connecting rods 39 are adjusted and the lengths of the adjacent mowing units 30 protruded from the mover main body 10 are adjusted so that the lengths are alternatingly varied such that the movable blades 33 do not interfere with each other. Once the mover main body 10 is started moving and the movable blades 33 of the mowing units 30 are started rotating, in response to a command from the moving controller 21, the self-propelled mower 1 can cut grasses while moving in a self-propelled manner.

Although each mowing unit 30 includes a single blade that rotates, as a movable blade in the first embodiment, mowing may be done with a movable blade that reciprocates or rotates and a fixed blade, or with a chain sew having chain-like external teeth that rotate around the outer circumference of a substantially disk-shaped plate. Further alternatively, a reel-type configuration may be used in which mowing is done with a movable blade that rotates vertically.

While the mowing units 30 is configured detachable to the mover main body 10 in the self-propelled mower 1, the mowing units 30 may be fixed. In such a configuration, the expandable wings 19 having the mowing units 30 attached thereto are receivable in the mover main body 10, by placing the left and right expandable wings 19 side by side in the longitudinal direction for retracting the expandable wings 19 within the mover main body 10, rather than placing them side by side in the transverse direction as shown in FIG. 1.

As another embodiment, the expandable wings 19 that protrude sideward from the face of the mover main body 10, may be configured to be swiveled upward, or the intermediate sections of the expandable wings 19 may be swiveled. Such swivel expandable wings 19 enable mowing on slopes and pruning of branches of standing trees at relatively high places since the expandable wings 19 are secured to the mover main body 10, having at predetermined angle defined with respect to the mover main body 10. Grasses on riversides may be also cut by placing the mover main body 10 on a boat, a raft, or a float ring which is floated on water, and securing the expandable wings 19 to the mover main body 10 at a predetermined angle.

Variant of Mowing Unit

Now referring to FIG. 3, a mowing units 30 in a self-propelled mower in accordance with a variant of the moving unit will be described.

Figure 3:
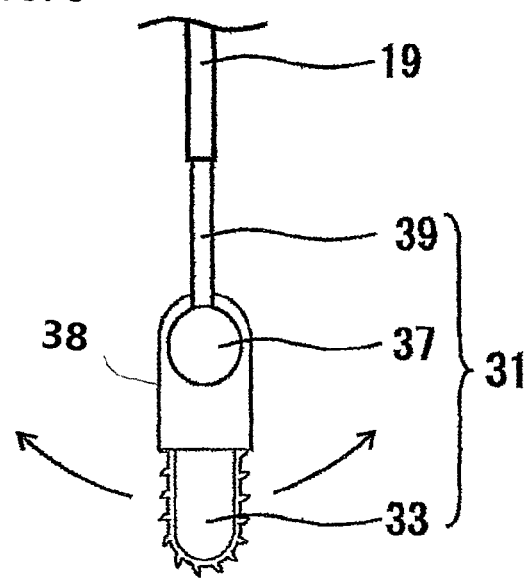
FIG. 3 is a plan view of an end of a protruding wing of a mowing unit in a self-propelled mower in accordance with a variant of the mowing unit.

In FIG. 3, a mowing unit 30 is provided protruding from an end of an expandable wing 19 so as to be freely attached to and detached from the end, and freely swivel in the transverse direction (the directions shown by the arrows in FIG. 3), and is pressed against the expandable wing 19 so as to be constantly in the line with the expandable wing 19. In the present variant, the mowing unit 30 includes a chain sew-type rotational blade 33, the top portion of which is covered with a movable blade cover 38. Similarly to the above-described mowing units 30, an electric motor 37 and a contact ball 35 are also provided. This configuration can prevent grasses around an obstacle, e.g., a standing tree, from being remained uncut, since the movable blade cover 38 contacts that obstacle and swing transversely with respect to the protruding direction.

Note that the mowing unit 30 in the present variant may be configured to be receivable into the expandable wing 19.

Furthermore, the rotational blade may be attached directly to the expandable wing 19, and in this configuration, the rotational blade is preferably an elongated chain sew-type rotational blade that is narrow in width. In this configuration, since the rotational blades are installed directly to the mover main body 10 or the rotational blades are attached directly to the mover main body 10, the size of self-propelled mower can be reduced.

Next, a self-propelled mower 1 in accordance with a first embodiment will be described with reference to FIG. 4.

The self-propelled mower 1 is suspended by a pair of suspension ropes 73, each hanging from corresponding one of a pair of pulleys 75 that straddle on and are coupled to a spanning cable 71 spanned in the air. In other words, a pair of suspension ropes 73 that extend to the left or to the right, are hung from the pulley 75 located in front, and a pair of suspension ropes 73, that extend to the left or to the right, are hung from the pulley 75 located in the rear;

hence, four suspension ropes 73 are hung in total. In the front and the rear of the mover main body 10, four suspension rope winches 77 are housed for the respective four suspension ropes 73, and the suspension rope winches 77 serve to provide the suspension ropes 73 with a predetermined tension. Note that the predetermined tension is the tension having a strength such that the suspension ropes 73 are not loosened when the self-propelled mower 1 moves on the ground, and is substantially the same tension as the tension given by the weight of the self-propelled mower 1 when the self-propelled mower 1 is hung in the air.

Figure 4:
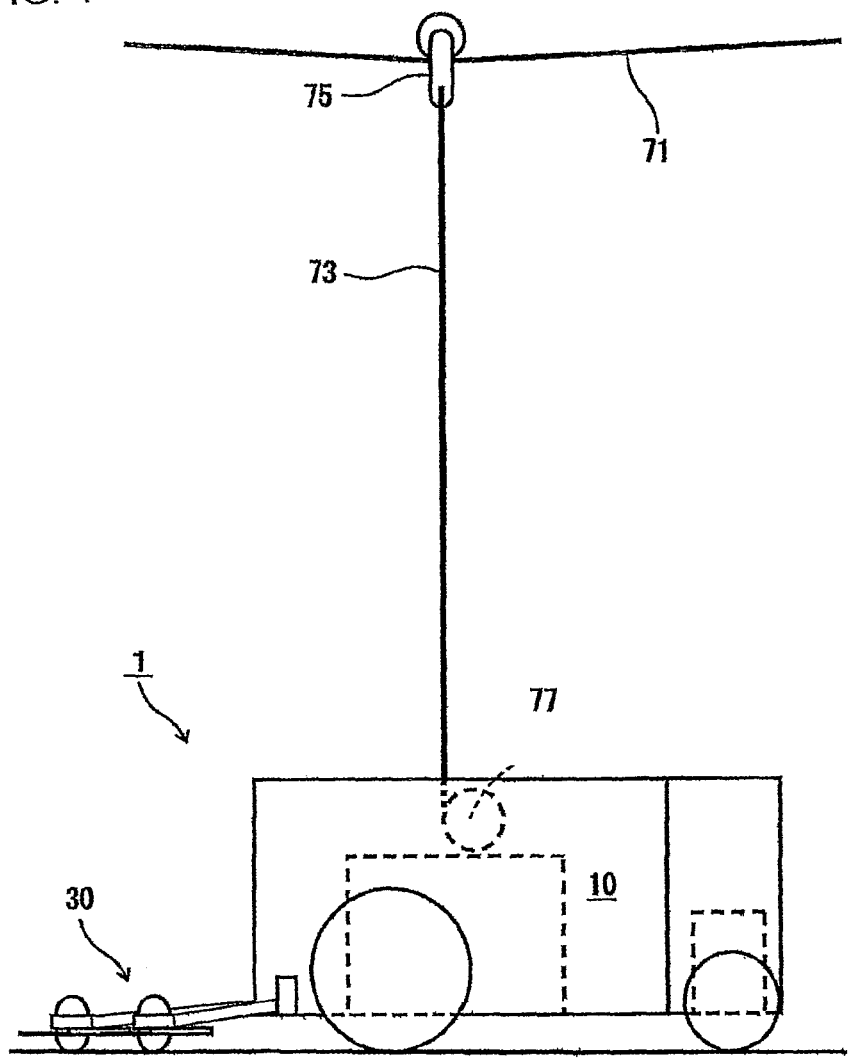
FIG. 4 is a side view of a self-propelled mower in accordance with the first embodiment.

Traverse pulleys (unillustrated) are pivoted so as to be freely rotated at both ends of the spanning cable 71, and the traverse pulleys are adapted to slide a pair of guide cables (unillustrated) spanned in direction traverse to the spanning cable 71, in other words, in the direction parallel to the direction from the front to the back in FIG. 4. This configuration enables the self-propelled mower 1 to move not only on a single line but move on any plains.

When the self-propelled mower 1 moves on the ground, the suspension ropes 73 prevent the mover main body 10 from falling down.

This advantage becomes significant when the self-propelled mower 1 is used on a slope face. Hanging the self-propelled mower 1 in the air enables pruning works at high places, such as standing trees.

Second Embodiment

Figure 5:
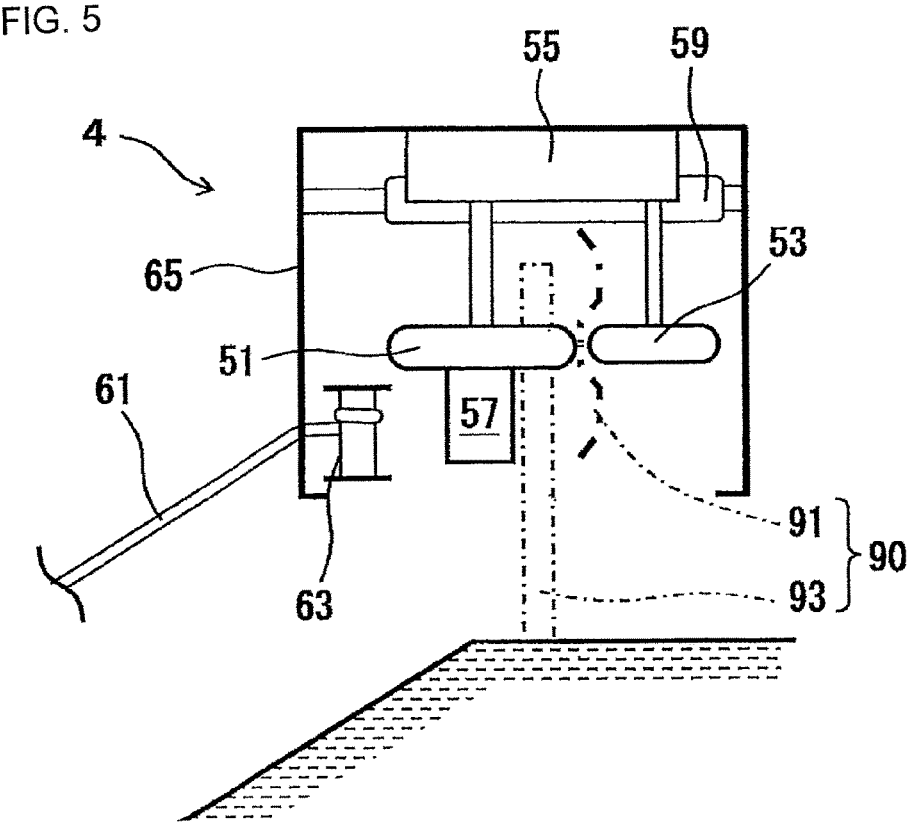
FIG. 5 is a cross-sectional view of a straddle-type mover body used in a self-propelled mower in accordance with a second embodiment.

Next, a self-propelled mower 1 in accordance with a second embodiment will be described with reference to FIG. 5. This self-propelled mower has a configuration similar to that of the above-described self-propelled mower 1, and a straddle-type mover body 4 used for self-propelled mower will be described.

The straddle-type mover body 4 is a mover that moves straddling on a guard rail 90, and includes generally mover main driving wheels 51 and mover passive wheels 53, which rotate while sandwiching the both sides of a beam 91 of a guard rail 90, horizontal rollers 59 that move on the top of the beam 91, a frame 65 that covers those components, and a traction rope 61 that tows a mover main body 10.

The mover main driving wheels 51 and the mover passive wheels 53 are pressed by the wheel pressing device 55 so as to continuously come closer to each other, and the rotational axes of the mover passive wheels 53 are fixed to the wheel pressing device 55, while the rotational axes of the mover main driving wheels 51 are slidable while being maintained vertically. A mover electric motor 57 is coupled to the mover main driving wheels 51, which are powered by a battery 11 electrically connected to the mover electric motor 57 through an electric power cord (unillustrated) provided adjacent to the traction rope 61. While the power source for the mover electric motor 57 is the battery 11 in second embodiment, a separate battery or electric generator may be provided inside the straddle-type mover body 4. Alternatively, as described the description of in the mover main body 10, in place of the electric motor, an engine may be used as a power source.

In addition, the radius of the mover main driving wheels 51 is greater than the distance between the surface of the beam 91 and the outer surface of the post 93. Thus, the straddle-type mover body 4 can climb over and pass the post 93 while straddle-type mover body 4 is driven by rotation of the mover main driving wheels 51. Since a mover main driving wheels 51 and the mover passive wheels 53 are provided in each of the front and the rear of the straddle-type mover body 4, the straddle-type mover body 4 can smoothly move straddling on the guard rail 90, without rocking.

Similarly to the mover main driving wheels 51 and the mover passive wheels 53, a horizontal roller 59 is provided in each of the front and the rear of the straddle-type mover body 4. The horizontal rollers 59 are supported rotatably to the frame 65, and are configured to roll the top of the beam 91, thereby serving to maintain the position of the straddle-type mover body 4 in the vertical direction. The surfaces of the horizontal rollers 59 are covered with an elastic material, such as a hard rubber.

The traction rope 61 towing the mover main body 10 outwardly extends from the center on the side of the mover main driving wheel 51 on the straddle-type mover body 4 in a plan view, one end thereof is reeled around a traction rope winch 63, and a traction rope angle sensor (unillustrated) is attached. This traction rope angle sensor detects the angle of the traction rope 61 with respect to the straddle-type mover body 4, and sends, if the detected angle exceeds a predetermined range, a signal notifying that fact to the moving controller and turns off the electric power supply from the battery 11. If the angle is equal to or smaller than the predetermined range, the electric power supply from the battery 11 is turned on.

The straddle-type mover body 4 serves as an auxiliary apparatus for the self-propelled mower 1, and a combination with the straddle-type mover body 4 facilitates mowing on slope faces. More specifically, the procedure for mowing on a slope face includes the following steps:

(1) The straddle-type mover body 4 is placed on the guard rail 90 installed on a top of a slope of a bank. Specifically, the pressing force by the wheel pressing device 55 is released, and the spacing between the mover main driving wheel 51 and the mover passive wheel 53 is extended to place the straddle-type mover body 4 on the beam 91. Thereafter, pressing force from the wheel pressing device 55 is applied again.

(2) The other end of the traction rope 61 is coupled to the mover main body 10, to tow the self-propelled mower 1 at a predetermined position of the slope face.

(3) Once supply of electric power to the wheel electric motor 17 in the mover main body 10 and the mover electric motor 57 in the straddle-type mover body 4 is turned on, the straddle-type mover body 4 starts to move on the guard rail 90 and the self-propelled mower 1 cuts grasses while moving on the slope face.

Then, the operation in (3) is carried out, while varying the length of the traction rope 61, to cut grasses on the slope face of the bank.

Here, since the moving speed of the straddle-type mover body 4 is selected to be faster than the moving speed of the self-propelled mower 1, the straddle-type mover body 4 is prone to move ahead of the self-propelled mower 1. Thus, if the traction rope angle sensor determines that the angle of the traction rope 61 with respect to the straddle-type mover body 4 exceeds the predetermined range, the position of the moving positions of the straddle-type mover body 4 is paced with the position of the self-propelled mower 1 by turning off only the electric power supply to the mover electric motor 57 in the straddle-type mover body 4.

While the straddle-type mover body 4 straddles on the guardrail 90, it may also be used on a fence or rope installed on the top of slope face.

As described above, a self-propelled mower in accordance with a first embodiment of the present invention includes: a self-propellable mover main body; at least one of a battery, an electric generator, and an engine, provided in the self-propellable mover main body; a protruding wing that protrudes sideward from sides of the mover main body, the protruding wing being retractable and an extension length of the protruding wing being variable; a plurality of mowing units provided protruding from a front face of the mover main body and a front face of the protruding wing, each including a movable blade that reciprocates or rotates to cut grasses driven by an electric motor or the engine, provided in the self-propellable mover main body, the electric motor being powered by the battery or the electric generator; a suspension rope hung from a spanning cable spanning in the air, the suspension rope suspending the mover main body such that mover main body moves on the ground or in the air while being suspended; and a pulley that is pivoted to an upper end of the suspension rope so as to be freely rotated such that the pulley moves through the spanning cable in accordance with a movement of the mover main body.

In addition, in the self-propelled mower in accordance with the first embodiment of the present invention, traverse pulleys may be pivoted to both ends of the spanning cable so as to be freely rotated, the traverse pulleys sliding on a pair of guide cables that span parallel to a direction traverse to the spanning cable.

Additionally, a self-propelled mower in accordance with a second embodiment of the present invention includes a self-propellable mover main body; at least one of a battery, an electric generator, and an engine, provided in the self-propellable mover main body; a protruding wing that protrudes sideward from sides of the mover main body, the protruding wing being retractable and an extension length of the protruding wing being variable; a plurality of mowing units provided protruding from a front face of the mover main body and a front face of the protruding wing, each including a movable blade that reciprocates or rotates to cut grasses driven by an electric motor or the engine, provided in the self-propellable mover main body, the electric motor being powered by the battery or the electric generator; a straddle-type mover body that straddles on a guard rail installed on a top of a slope of a bank, the mover main body moving on a slope face while being towed by the mover main body via a traction rope, a moving speed of the straddle-type mover body being selected to be faster than a moving speed of the mover main body; and an angle sensor that detect an angle of the traction rope, and is provided to the traction rope on a side of the straddle-type mover body; and a controller that stops the movement of the straddle-type mover body if the angle detected by the angle sensor exceeds an acceptable angle.

Furthermore, in the self-propelled mower in accordance with the second embodiment of the present invention, the straddle-type mover body may include a pair of wheels that sandwich a beam of the guard rail by pressing a front and a rear of the beam with a predetermined pressing force, and a radius of the wheel located on the side of the post of the guard rail maybe greater than a distance between a surface of the beam and an outer surface of the post.

In addition, in the self-propelled mower in accordance with the first or second embodiment of the present invention, the mowing unit may be coupled to a coupler that is provided to the mover main body and the protruding wing, via a connecting rod that is pivoted to swivel only vertically, and a semispherical contact ball may protrude on a lower face of the mowing unit so as to contact and slide on the ground, wherein a protrusion height of the contact ball may be adjustable.

Additionally, in the self-propelled mower in accordance with the first or second embodiment of the present invention, the respective mowing ranges of the mowing units may overlap when viewed from a moving direction. Furthermore, the self-propelled mower in accordance with the first or second embodiment of the present invention may further include a second mowing unit that protrudes an end of the protruding wing, so as to be freely attached to or detached from the end, and freely swivel in a transverse direction, and the second mowing unit may be pressed against the protruding wing so as to be in line with the protruding wing.

In addition, in the self-propelled mower in accordance with the first or second embodiment of the present invention, a rotational blade may be attached to the protruding wing.

Additionally, in the self-propelled mower in accordance with the first embodiment of the present invention, the protruding wing that protrudes sideward from the side of the mover main body may be configured to swivel upwardly and to be capable of being secured at a predetermined position.

Furthermore, the self-propelled mower in accordance with the first or second embodiment of the present invention may include: a pair of main driving wheels in a front of the mover main body; a pair of driven wheels in a rear of the mover main body; and a pair of traverse wheels that are attached to sides of the mover main body in a direction perpendicular to the main driving wheels and the driven wheels, respectively, the traverse wheels being retractable in a vertical direction and are detachable.

In addition, the second embodiment may be combined with the first embodiment. In the self-propelled mower in accordance with the first embodiment of the present invention, a straddle-type mover body that straddles on a guard rail installed on a top of a slope of a bank, the mover main body moving on a slope face while being towed by the mover main body via a traction rope, a moving speed of the straddle-type mover body being selected to be faster than a moving speed of the mover main body; and an angle sensor that detect an angle of the traction rope, and is provided to the traction rope on a side of the straddle-type mover body; and a controller that stops the movement of the straddle-type mover body if the angle detected by the angle sensor exceeds an acceptable angle.

The first and second embodiments of present invention have the following advantageous effects provided by the above-identified configurations:

(1) The mover main body that is provided with at least one of the battery, the electric generator, and the engine, which are relatively heavy, and the mowing unit, are provided as separated components, and the protruding wing is configured to be retractable and its extension length is variable. Thus, the self-propelled mower has a relatively simplified structure, allows adjustment of the mowing width, and can be carried easily.

(2) Since the mowing unit is pin-jointed to the vicinity of the mover main body via the connecting rod and is supported on the ground via the contact ball, no extra force, e.g., torsion, is exerted on the mowing unit. Thus, the self-propelled mower can move cutting grasses, while a predetermined spacing is maintained constantly relative to the ground.

(3) Since the respective mowing ranges of the mowing units overlap relative to the moving direction, no grasses would be remained uncut.

(4) The mowing unit is configured to protrude the end of the protruding wing, so as to freely swivel in a transverse direction, and the mowing unit is pressed against the protruding wing so as to be in line with the protruding wing. Even if there is an obstacle, since the mowing unit bends, the mowing work can be continued, and no grasses is remained uncut around the obstacle.

(5) Since the rotational blade is attached to the protruding wing, the rotational blade is provided directly to the mover main body, which helps to reduce the size of the self-propelled mower.

(6) The protruding wing is configured to swivel upwardly and to be capable of being secured at a predetermined position, which enables mowing on slopes and pruning of standing trees.

(7) By providing a pair of traverse wheels to sides of the mover main body in a direction perpendicular to the main driving wheels and the driven wheels, the mover main body can be easily displaced horizontally in the direction perpendicular to moving direction. Furthermore, since the traverse wheels are detachable, the mover main body can be stably secured even on a slope by replacing the wheels with a jack base. Hence, high place work can be safely done on the slope.

(8) The mover main body towed by the straddle-type mover body moves on the slope face, and grasses on the slope face are cut. Further, by adjusting the extension length of the protruding wing, not only the mowing width can be adjusted, but the mowing unit coupled via the connecting rod can move, with cutting grasses relative to the ground, while a predetermined spacing is maintained constantly, enabling usage on a curved slope faces. Furthermore, since a moving speed of the straddle-type mover body is selected to be faster than a moving speed of the main move, the straddle-type mover body is prone to move ahead, and it is sufficient to stop only the movement of the straddle-type mover body by the angle sensor.

(9) Since a radius of the wheel located on the side of the post of the straddle-type mover body is greater than a distance between a surface of the beam and an outer surface of the post, the straddle-type mover body can climb over and pass the post and the post does not interfere with the movement of the straddle-type mover body.

(10) Since the mover main body is suspended from the spanning cable, not only falling down of the mover main body is prevented but also high place works, e.g., pruning of standing trees, are made possible.

The guide cable also facilitates the movement of mover main body in front and behind, and to the left and to the right.

What is claimed is:

1. A system comprising:
   a self-propellable mover comprising a self-propellable mover main body;
   a spanning cable;
   a suspension rope hung from the spanning cable, the suspension rope suspending the mover main body such that the mover main body moves on the ground or in the air while being suspended;
   a pulley that is pivoted to an upper end of the suspension rope so as to be freely rotated such that the pulley moves along the spanning cable in accordance with a movement of the mover main body;
   a pair of guide cables spanned parallel to a direction traverse to the spanning cable; and
   traverse pulleys configured to be pivoted to both ends of the spanning cable so as to be freely rotated, the traverse pulleys sliding on the pair of guide cables.

2. The system according to claim 1, wherein the mover main body comprises:
   a pair of main driving wheels in a front of the mover main body;
   a pair of driven wheels in a rear of the mover main body; and
   a pair of traverse wheels that are attached to sides of the mover main body in a direction perpendicular to the main driving wheels and the driven wheels, respectively, the traverse wheels being retractable in a vertical direction and are detachable.

3. The system according to claim 1, wherein the mover main body is a mower comprising a mowing unit.

4. A system comprising:
   a self-propellable mover comprising a self-propellable mover main body;
   a straddle-type mover body that straddles on a guard rail, a fence, or a rope, installed on a top of a slope of a sloped face, the mover main body moving on the slope face while being towed by the straddle-type mover body via a traction rope, a moving speed of the straddle-type mover body being selected to be faster than a moving speed of the mover main body;
   an angle sensor that detects an angle of the traction rope, and is provided to the traction rope on a side of the straddle-type mover body; and
   a controller that stops the movement of the straddle-type mover body if the angle detected by the angle sensor exceeds an acceptable angle.

5. The system according to claim 4, wherein the straddle-type mover body straddles on the guard rail, and the straddle-type mover body comprises a pair of wheels that sandwich a beam of the guard rail by pressing a front and a rear of the beam with a predetermined pressing force, and
   a radius of a wheel located on the side of a post of the guard rail is greater than a distance between a surface of the beam and an outer surface of the post.

6. The system according to claim 4, wherein the mover main body comprises:
   a pair of main driving wheels in a front of the mover main body;
   a pair of driven wheels in a rear of the mover main body; and
   a pair of traverse wheels that are attached to sides of the mover main body in a direction perpendicular to the main driving wheels and the driven wheels, respectively, the traverse wheels being retractable in a vertical direction and are detachable.

7. The system according to claim 4, wherein the mover main body is a mower comprising a mowing unit.

* * * * *